(12) United States Patent
Hu et al.

(10) Patent No.: US 11,499,724 B2
(45) Date of Patent: Nov. 15, 2022

(54) HEATED FLOOR PANELS

(71) Applicant: Goodrich Corporation, Charlotte, NC (US)

(72) Inventors: Jin Hu, Hudson Village, OH (US); Nathaniel Ching, Hartville, OH (US); Casey Slane, Tallmadge, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 406 days.

(21) Appl. No.: 16/453,220

(22) Filed: Jun. 26, 2019

(65) Prior Publication Data

US 2020/0011543 A1  Jan. 9, 2020

Related U.S. Application Data

(60) Provisional application No. 62/693,560, filed on Jul. 3, 2018.

(51) Int. Cl.
*F24D 13/02* (2006.01)
*B64C 1/18* (2006.01)
(Continued)

(52) U.S. Cl.
CPC ............. *F24D 13/024* (2013.01); *B64C 1/18* (2013.01); *B32B 3/12* (2013.01); *B32B 15/046* (2013.01);
(Continued)

(58) Field of Classification Search
CPC ........... F24D 13/024; B64C 1/18; B32B 3/12; B32B 15/046; B32B 15/08;
(Continued)

(56) References Cited

U.S. PATENT DOCUMENTS

| | | | |
|---|---|---|---|
| 7,800,028 | B2 | 9/2010 | Wang |
| 9,161,393 | B2 | 10/2015 | Kaiserman et al. |
| 9,630,701 | B2 | 4/2017 | Hu |
| 9,939,087 | B2 | 4/2018 | Kolarski et al. |

(Continued)

FOREIGN PATENT DOCUMENTS

| | | |
|---|---|---|
| EP | 2113456 A2 | 11/2009 |
| EP | 3015360 A1 | 5/2016 |

(Continued)

OTHER PUBLICATIONS

Extended European Search Report dated Oct. 31, 2019, issued during the prosecution of corresponding European Patent Application No. EP 19182838.3.

*Primary Examiner* — Shawntina T Fuqua

(74) *Attorney, Agent, or Firm* — Locke Lord LLP; Joshua L. Jones; Scott D. Wofsy

(57) ABSTRACT

A heater panel includes a core and a heater/dielectric layer including a positive thermal coefficient (PTC) heater layer between a pair of dielectric layers. A structural facing is included, wherein the heater/dielectric layer is bonded directly between the core and the structural facing. A second structural facing can be bonded to the core opposite the heater/dielectric layer. An impact layer can be bonded to the structural facing, e.g., the first structural facing described above, opposite the heater/dielectric layer. The heater layer can be formed by direct writing a heating element pattern onto a dielectric layer bonded to the core.

17 Claims, 3 Drawing Sheets

(51) Int. Cl.
*B32B 3/12* (2006.01)
*B32B 15/04* (2006.01)
*B32B 15/08* (2006.01)

(52) U.S. Cl.
CPC ......... *B32B 15/08* (2013.01); *B32B 2305/024* (2013.01); *B32B 2605/18* (2013.01); *H05B 2203/02* (2013.01); *H05B 2203/026* (2013.01)

(58) Field of Classification Search
CPC ............ B32B 2605/18; H05B 2203/02; H05B 2203/026; H05B 2203/024; H05B 2203/017; H05B 3/286; H05B 3/28; H05B 3/145; H05B 3/12; H05B 3/20; H05B 3/02
See application file for complete search history.

(56) References Cited

U.S. PATENT DOCUMENTS

| | | | |
|---|---|---|---|
| 2010/0065686 A1* | 3/2010 | Tauscher | H05B 3/145 244/129.1 |
| 2014/0071216 A1 | 3/2014 | Hu et al. | |
| 2016/0007474 A1 | 1/2016 | Dardona et al. | |
| 2016/0121993 A1* | 5/2016 | Nehring | H05B 3/34 244/118.5 |
| 2016/0270153 A1* | 9/2016 | Duce | H05B 3/36 |
| 2016/0340020 A1* | 11/2016 | Owens | B64C 1/18 |
| 2017/0158898 A1 | 6/2017 | Xiao et al. | |
| 2017/0254065 A1 | 9/2017 | Hegenbart et al. | |
| 2018/0124874 A1 | 5/2018 | Dardona et al. | |

FOREIGN PATENT DOCUMENTS

| | | |
|---|---|---|
| EP | 3095690 A2 | 11/2016 |
| EP | 3339013 A1 | 6/2018 |
| JP | H0732518 A | 2/1995 |

* cited by examiner

HEATED FLOOR PANELS

CROSS-REFERENCE TO RELATED APPLICATIONS

This application claims priority to U.S. Provisional Patent Application No. 62/693,560 filed Jul. 3, 2018, which is incorporated by reference herein in its entirety.

BACKGROUND OF THE INVENTION

1. Field of the Invention

The present disclosure relates to heated panels, and more particularly to heated floor panels such in aircraft.

2. Description of Related Art

Positive thermal coefficient (PTC) materials increase in electrical resistance as their temperature rises. PTC materials are useful in heating panels such as used in heating aircraft floors, due to their intrinsic limits on temperature. Carbon-based PTC heaters for aircraft floor panels are traditionally fabricated by screen printing a PTC-based ink in a desired heating element pattern as a layer in a series of layers making up the panel. Screen printing requires preparation of the screen, and an excess amount of ink is required for the screen printing process, i.e. more ink must go into the process than actually ends up in the floor panel. The balance of the ink used in the process must be disposed of.

Aircraft floor panels are subject to a wide variety of impacts from dropped objects both sharp and blunt in nature. A floor panel must also be resistant to knife cuts as part of installation and maintenance of the floor panel. A floor panel's ability to withstand both impact and knife cuts is important for promoting a robust floor panel. Traditional surface layer materials used in composite panels are usually unable to withstand repeated or high load impacts as well as knife cuts.

The conventional techniques have been considered satisfactory for their intended purpose. However, there is an ever present need for improved heated panels and process for making the same. This disclosure provides a solution for this need.

SUMMARY OF THE INVENTION

A heater panel includes a core and a heater/dielectric layer including a positive thermal coefficient (PTC) heater layer between a pair of dielectric layers. A structural facing is included, wherein the heater/dielectric layer is bonded directly between the core and the structural facing.

The core can include at least one of a honeycomb structure and/or a foam material. The structural facing can be a first structural facing, and a second structural facing can be bonded to the core opposite the heater/dielectric layer. The first structural facing and the second structural facing can each include carbon fiber impregnated with a resin, wherein the resin includes at least one of a thermoplastic material and/or a thermoset material.

An impact layer can be bonded to the structural facing, e.g., the first structural facing described above, opposite the heater/dielectric layer. The impact layer can include at least one of a monolithic metal, a monolithic polymer, a resin-impregnated metal, and/or a resin-impregnated polymer fabric.

The heater layer can be formed by direct writing a heating element pattern onto a dielectric layer bonded to the core. The core, heater/dielectric layer, and structural facing can be contoured out of plane.

A method of making a heater panel includes direct writing a positive thermal coefficient (PTC) heater layer onto a first dielectric layer. The method includes bonding a second dielectric layer to the PTC heater layer and to the first dielectric layer to make a heater/dielectric layer. The method includes bonding a first dielectric layer to a core and bonding a structural facing to the heater/dielectric layer so the heater/dielectric layer is bonded directly between the core and the structural facing.

The structural facing can be a first structural facing, and the method can include bonding a second structural facing to the core opposite the heater/dielectric layer. The method can include bonding an impact layer to the structural facing opposite the heater/dielectric layer. Direct writing the PTC heater layer onto the first dielectric layer can include direct writing a heating element pattern onto the first dielectric layer with the first dielectric layer already bonded to the core. Direct writing the PTC heater layer can include direct writing a heating element pattern along a three-dimensional contour. The method can include direct writing a close out layer to the heater/dielectric layer for bonding the structural facing to thereto.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
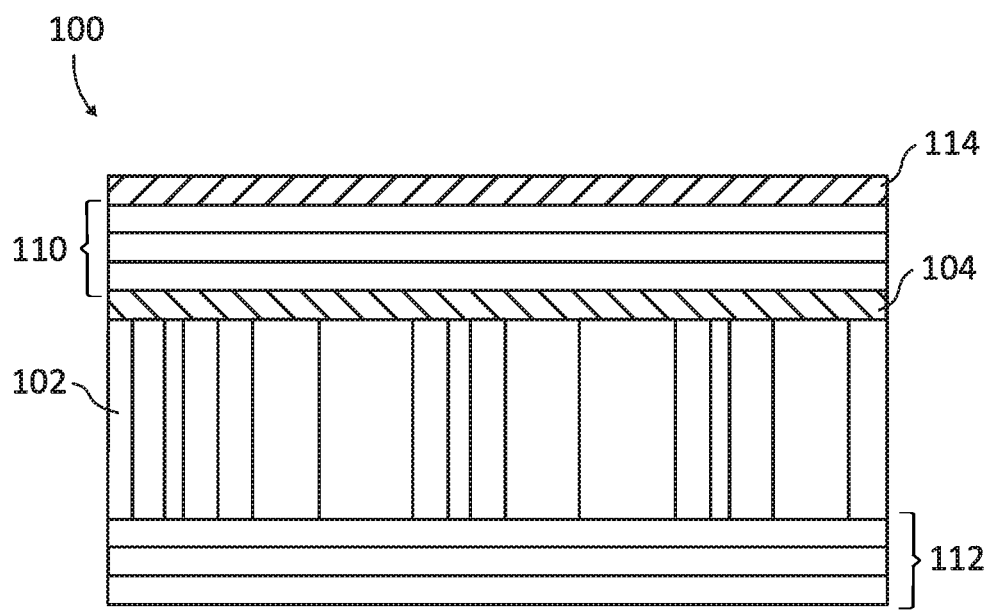
FIG. 1 is a schematic cross-sectional view of an exemplary embodiment of a heater panel constructed in accordance with the present disclosure, showing the heater/dielectric layer between the core and the first structural facing.

Reference will now be made to the drawings wherein like reference numerals identify similar structural features or aspects of the subject disclosure. For purposes of explanation and illustration, and not limitation, a partial view of an exemplary embodiment of a heater panel in accordance with the disclosure is shown in FIG. 1 and is designated generally by reference character 100. Other embodiments of heater panels in accordance with the disclosure, or aspects thereof, are provided in FIGS. 2-4, as will be described. The systems and methods described herein can be used to provide heater panels, e.g., for aircraft floors and other surfaces including contoured surfaces.

Figure 3:
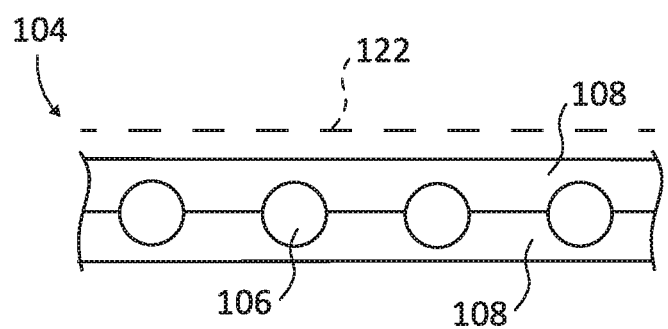
FIG. 3 is a schematic cross-sectional view of the heater/dielectric layer of FIG. 2, showing the dielectric layers.

The heater panel 100 includes a core 102 and a heater/dielectric layer 104. The core 102 includes at least one of a honeycomb structure and/or a foam material. As shown in FIG. 3, the heater/dielectric layer 104 is an assembly that includes a positive thermal coefficient (PTC) heater layer 106 between a pair of dielectric layers 108. A first structural facing 110 is included, wherein the heater/dielectric layer 104 is bonded directly between the core 102 and the first structural facing 110. A second structural facing 112 is bonded to the core 102 opposite the heater/dielectric layer 104. The first structural facing 110 and the second structural facing 112 each include carbon fiber impregnated with a resin, wherein the resin includes at least one of a thermoplastic material (such as PEEK, PC, PPS, and PEI) and/or a thermoset material (such as epoxy, phenolic, bis-Maleimide resins (BMI), and benzoxazine).

An impact layer 114 is bonded to the first structural facing 110 opposite the heater/dielectric layer 104. The impact layer 114 includes at least one of a monolithic metal such as aluminum or titanium, a monolithic polymer, a resin-impregnated metal, and/or a resin-impregnated polymer fabric. Suitable monolithic polymer materials include thermoplastics such as polyetheretherketone, polyaryletherketones, polycarbonate, polyphenylene sulfide, polyetherimide, polyimide, polymethylmethacrylate (acrylic), polyvinylchloride, polyurethane, polyamideimide and thermoset materials such as epoxy, phenolic, BMI, benzoxazine, and polyurethane. The foregoing polymers can be mixed, and can have reinforcement such as aramids (such as Kevlar fibers and Nomex fibers available from DuPont of Wilmington, Del.), fiberglass, basalt, carbon fiber, carbon nanotube, nano steel, steel wire, and titanium wire. Any of the foregoing polymers can be impregnated into the reinforcements assuming temperature compatibility.

A method of making a heater panel, e.g., heater panel 100, includes direct writing a PTC heater layer, e.g., PTC layer 106, onto a first dielectric layer, e.g., the lower most dielectric layer 108 in FIG. 3 which can be a sheet of Kapton material available from DuPont of Wilmington, Del., for example. The PTC heater layer can be closed out with an adhesive and a second dielectric layer, e.g., the upper most dielectric layer in FIG. 3, can be bonded with the adhesive to the PTC heater layer and to the first dielectric layer to make a heater/dielectric layer, e.g. heater dielectric layer 104. The method includes bonding the first dielectric layer to a core, e.g., core 102. The method includes bonding a first structural facing, e.g., structural facing 110, to the heater/dielectric layer so the heater/dielectric layer is bonded directly between the core and the first structural facing.

The method includes bonding a second structural facing, e.g., second structural facing 112, to the core opposite the heater/dielectric layer. The method includes bonding an impact layer, e.g., impact layer 114, to the first structural facing opposite the heater/dielectric layer.

Figure 2:
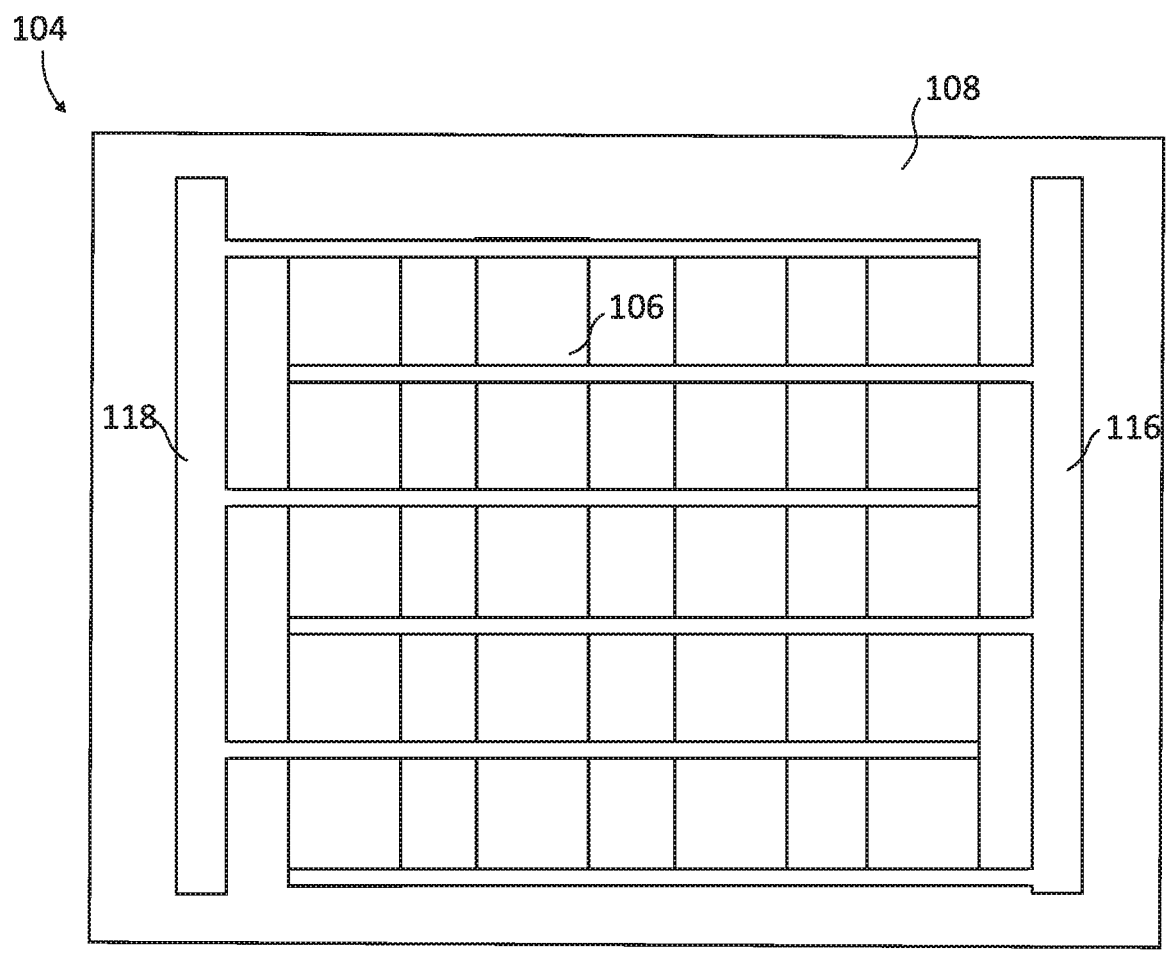
FIG. 2 is a schematic planar view of a portion of the heater panel of FIG. 1, showing the heater element pattern of the heater/dielectric layer.

With reference to FIG. 2, direct writing the PTC heater layer 106 onto the first dielectric layer 108 includes direct writing a heating element pattern onto the first dielectric layer, e.g., the lower most of the dielectric layers 108 of FIG. 3, with the first dielectric layer already bonded to the core 102, e.g. bonded using a film adhesive or prepregged fiberglass layer. FIG. 2 shows an exemplary heating element pattern for the PTC heater layer 106, which has multiple redundant electrical pathways for current to flow from one bus bar 116 to the other bus bar 118. The bus bars 116 and 118 can also be directly written on the first dielectric layer 108 and/or onto the PTC heater layer 106.

As shown in FIG. 3, with the heater element pattern, there are places in the heater/dielectric layer 104 where the dielectric layers 108 directly contact one another, and other places where the actual heater element of the PTC heater layer 106 is sandwiched between the dielectric layers 108. Those skilled in the art will readily appreciate that heater element pattern shown in FIG. 2 is exemplary only, and that any other suitable pattern can be used without departing from the scope of this disclosure.

Figure 4:
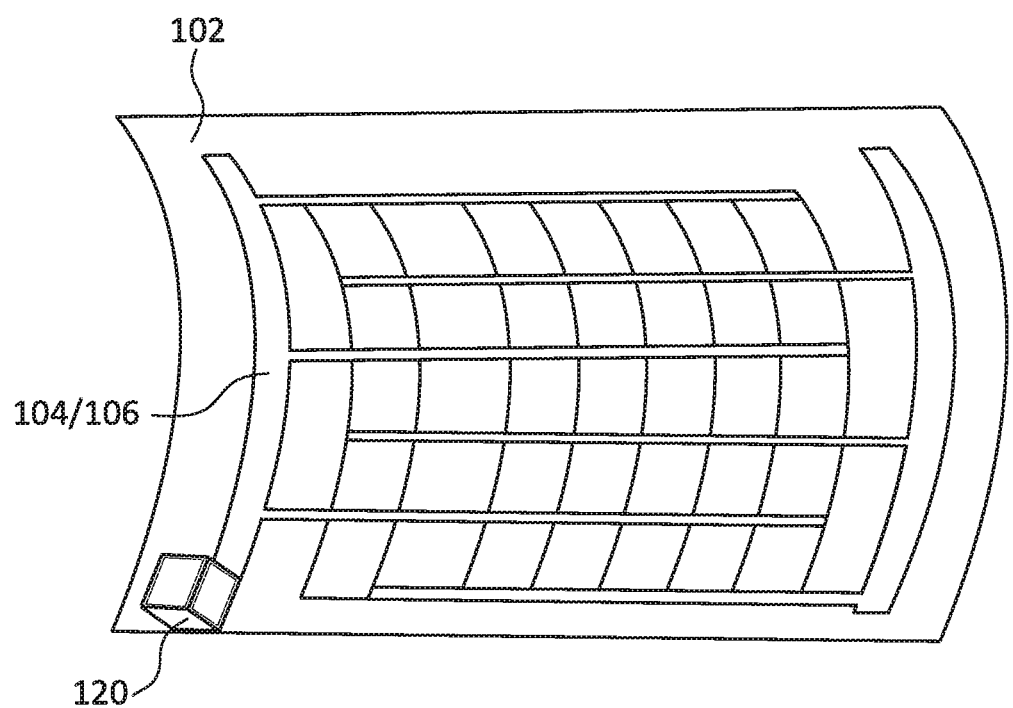
FIG. 4 is a schematic perspective view of a heater panel of FIG. 1, schematically showing the direct writing of the heater element pattern on a contoured surface.

As shown in FIG. 4, direct writing the PTC heater layer 106 onto the core 102 can include direct writing the heating element pattern onto a prepared dielectric layer 108 (that is bonded on the core 102) along a three-dimensional contour, e.g., where the core 102 is contoured rather than planar. FIG. 4 schematically shows a direct writing device 120 in the process of direct writing the heater element pattern of the PTC heater layer 106 onto a contoured core 102. An example of a suitable direct writing device is the nScrypt printer available from nScrypt, Inc. of Orlando, Fla., which utilize a SmartPump™ pump for drop to drop direct writing. Any other suitable pump type can be used such as pneumatic pumps or extruder type pumps such as an nScrypt nFD™ device. It is also contemplated that any other suitable contour, including complex curvatures, or planar geometry can be used without departing from the scope of this disclosure. The method includes direct writing a close out layer 122, labeled in FIG. 3, to the heater/dielectric layer 104 for bonding the first structural facing 110 to thereto. Other layers such as the impact layer 114 and the second structural facing 112 can be bonded to the respective surfaces of the heater panel 100 as required using film adhesives or the like.

The direct writing process utilizes almost all of the PTC ink material of the process into the actual heater panel 100, reducing or eliminating the waste in ink of traditional screen printing processes in which substantial amounts of ink used in the process do not actually end up in a panel. The direct writing process can also eliminate the need to have screens produced and maintained for each unique heater pattern. Heater panels as disclosed herein can be used for planar applications, such as heated floor panels for aircraft, or contoured panel applications such as aircraft walls or any other suitable geometry. Those skilled in the art will readily appreciate that in addition to or in lieu of close out layer 122 and film adhesives, sections of the heater panel 100 can be laminated or bonded and can be laminated on, bonded on, or co-cured with the panel structure of heater panel 100.

The methods and systems of the present disclosure, as described above and shown in the drawings, provide for heater with superior properties relative to traditional heater panels including reduced use of PTC ink, the ability to make heater panels that are contoured, improved knife cut ant impact resistance, lighter weight, longer life and improved robustness. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A heater panel comprising:
   a core;
   a heater/dielectric layer including a positive thermal coefficient (PTC) heater layer between a pair of dielectric layers; and a structural facing, wherein the heater/dielectric layer is bonded directly between the core and the structural facing, wherein the core, heater/dielectric layer, and structural facing are contoured out of plane, wherein the PTC heater layer is direct written onto one of the dielectric layers that is already contoured out of plane prior to printing the PTC heater layer.

2. The heater panel as recited in claim 1, wherein the core includes at least one of a honeycomb structure and/or a foam material.

3. The heater panel as recited in claim 1, wherein the structural facing is a first structural facing, and further comprising a second structural facing bonded to the core opposite the heater/dielectric layer.

4. The heater panel as recited in claim 3, wherein the first structural facing and the second structural facing each include carbon fiber impregnated with a resin, wherein the resin includes at least one of a thermoplastic material and/or a thermoset material.

5. The heater panel as recited in claim 1, further comprising an impact layer bonded to the structural facing opposite the heater/dielectric layer.

6. The heater panel as recited in claim 5, wherein the impact layer includes at least one of a monolithic metal, a monolithic polymer, a resin-impregnated metal, and/or a resin- impregnated polymer fabric.

7. The heater panel as recited in claim 1, wherein the heater layer is formed by direct writing a heating element pattern onto a dielectric layer bonded to the core.

8. The heater panel as recited in claim 1, wherein the structural facing is a first structural facing and further comprising: a second structural facing bonded to the core opposite the heater/dielectric layer; and an impact layer bonded to the first structural facing opposite the heater/dielectric layer.

9. A method of making a heater panel comprising:
direct writing a positive thermal coefficient (PTC) heater layer onto a first dielectric layer wherein the first dielectric layer is curved prior to and during direct writing;
bonding a second dielectric layer to the PTC heater layer and to the first dielectric layer to make a heater/dielectric layer;
bonding a first dielectric layer to a core; and
bonding a structural facing to the heater/dielectric layer so the heater/dielectric layer is bonded directly between the core and the structural facing, wherein the core, heater/dielectric layer, and structural facing are contoured out of plane.

10. The method as recited in claim 9, wherein the core includes at least one of a honeycomb structure and/or a foam material.

11. The method as recited in claim 9, wherein the structural facing is a first structural facing, and further comprising bonding a second structural facing to the core opposite the heater/dielectric layer.

12. The method as recited in claim 11, wherein the first structural facing and the second structural facing each include carbon fiber impregnated with a resin, wherein the resin includes at least one of a thermoplastic material and/or a thermoset material.

13. The method as recited in claim 9, further comprising bonding an impact layer to the structural facing opposite the heater/dielectric layer.

14. The method as recited in claim 13, wherein the impact layer includes at least one of a monolithic metal, a monolithic polymer, a resin-impregnated metal, and/or a resin-impregnated polymer fabric.

15. The method as recited in claim 9, wherein direct writing the PTC heater layer onto the first dielectric layer includes direct writing a heating element pattern onto the first dielectric layer with the first dielectric layer already bonded to the core.

16. The method as recited in claim 15, wherein direct writing the PTC heater layer includes direct writing a heating element pattern along a three-dimensional contour.

17. The method as recited in claim 9, further comprising direct writing a close out layer to the heater/dielectric layer for bonding the structural facing to thereto.

* * * * *